United States Patent [19]
Cavaioli et al.

[11] Patent Number: 4,719,637
[45] Date of Patent: Jan. 12, 1988

[54] LASER DOPED WITH TRIPROPYLAMINE

[75] Inventors: Marco Cavaioli; Gianemilio Salvetti; Renato Marchetti; Eugenio Penco, all of Rome, Italy

[73] Assignees: Enea-Comitato Nazionale per la Ricerca e lo Sviluppo Dell'Energia Nucleare e Delle Energie Alternative; Selenia-Industrie Elettroniche Associate S.p.A., both of Rome, Italy

[21] Appl. No.: 838,944

[22] Filed: Mar. 12, 1986

[30] Foreign Application Priority Data

Mar. 13, 1985 [IT] Italy ............... 47806 A/85

[51] Int. Cl.$^4$ ............ H01S 3/22; H01S 3/223; H01S 3/097
[52] U.S. Cl. ............ 372/59; 372/60; 372/83; 372/86; 372/87
[58] Field of Search ............ 372/59, 60, 55, 83, 372/86, 87

[56]  References Cited
U.S. PATENT DOCUMENTS 3,934,212  1/1976  Javan et al. ............ 372/60
4,584,689  4/1986  List et al. ............ 372/60

OTHER PUBLICATIONS

Marchetti et al. "Extended Gas Lifetime Operation of a Miniature Transversely Excited Atmosphere $CO_2$ Laser Doped with Tripropylamine", Appl. Phys. Lett. 41(7), Oct. 1, 1982, pp. 601–603.
Morikawa "Effects of Low-Ionization Gas Additive Along with UV Photopreionization on $CO_2$ TEA Laser Operation", Journal of Applied Physics, vol. 48, No. 3, Mar. 1977, pp. 1229–1239.

Primary Examiner—Eugene R. LaRoche
Assistant Examiner—Michael B. Shingleton
Attorney, Agent, or Firm—Stevens, Davis, Miller & Mosher

[57]  ABSTRACT

In order of maintaining at the more constant level the $CO_2$ content in the gaseous mixture discharge of a transversely excited atmospheric pressure laser, a polymer product is included in advance of the laser operation in the laser chamber or within the closed fluidtight circuit where the gaseous mixture is recycled. Such polymer is produced by irradiating tripropylamine with ultraviolet photons and/or with energy electrons in the form of a layer whereby at least a portion of a solid support is coated.

4 Claims, 3 Drawing Figures

LASER DOPED WITH TRIPROPYLAMINE

The present invention relates to a method for maintaining the $CO_2$ content in a discharge gaseous mixture of a transversely excited atmospheric pressure laser at the more constant level obtainable.

$CO_2$ lasers usually operate with a mixture of three gases: $CO_2$ which comprises the active medium for obtaining the laser action, $N_2$ and He the function of which is for favouring the $CO_2$ excitation process.

Such excitation occurs through generation of an electric discharge at the inside of the gaseous mixture and then through collision among the $CO_2$ molecules and the discharge electrones and among the $N_2$ molecules excited by the discharge electrons. In addition to the excitation positive effect such collisions have however a negative effect in as much as the dissociation of the $CO_2$ molecules is favoured with the consequent formation of CO and $O_2$.

Either subsequent to a certain number of electric discharges in the pulsed laser systems or subsequent to a certain lapse of time in the continuous systems a noteworthy decrease of the $CO_2$ quantity in the mixture occurs with a progressive decrease of the emitted power down to the total "estinguishment" of the system. Concurrently, the simultaneous increase of the molecular oxygen in the mixture can produce the generation of strong instabilities in the dynamics of the electric discharge whereby the heating (and dissociation) processes of the mixture are further favoured which can cause a damage of the laser components such as the discharge electrodes.

For the above reasons and up to a few years ago all the $CO_2$ laser systems either commercial or laboratory, have been operated with the continuous replacement of the gaseous mixture that is with a continuous flow of a "fresh" mixture as a substitution for that through which the excitation discharge had been carried out.

It is understood that all the problems associated with the $CO_2$ dissociation are greatly reduced through such a method; however the operation cost of $CO_2$ lasers is thereby noteworthy high.

First of all the cost of helium is to be considered along with the cost of some specific applications where expensive $CO_2$ isotopic species are required for the laser operation.

Furthermore the possibility of using such devices is noteworthy reduced by the continuous flow (not recycled) operation where the maximum of compactness and the absence of gas bottles are required. In all these cases the $CO_2$ lasers must operate in a "sealed" regime for the longest possible time that is without any mixture replacement. For achieving this, the $CO_2$ dissociation must be controlled by favouring the ricombination of the dissociation products—CO and $O_2$—in the gaseous mixture after a certain number of operating hours or after a member of electric discharges. This has been achieved by various research groups by resorting to two different techniques as follows:

1. One or more gaseous species have been added to the ternary gaseous mixture (such as, for instance $H_2$ and hydrogen donors, CO, etc.).
2. Solid catalysts have been introduced into the laser chamber to contact the ternary gas mixture (for instance platinum catalysts).

By the present invention it is aimed to use, for the laser construction, such elements (for instance the main discharge electrodes or the supports thereof) which are coated by a particular polymer obtained through radiation by means of energy electrons or by ultraviolet radiation of an organic macromolecule that is tripropylamine (TPA).

Tripropylamine is a substance well known to those who works with $CO_2$ lasers in as much as very little quantities (traces) are often added to the ternary mixture of said devices for favouring the discharge excitation stability and improving the efficiency thereof.

During some tests with $CO_2$ pulsed lasers operating in a "sealed" regime with gas mixtures to which tripropylamine had been added, it was noted that not only the electric discharge and consequently the device efficiency had been stabilized, as already known, but the lifetime of the $CO_2$ based mixtures—when operated in a sealed regime—had been noteworthy longer due to such addition.

Such an ascertainment has been the object of a communication by the present inventors on Appl. Physics Letter 41(7) dated on Oct. 1, 1982.

Through a deeper examination of the phenomenon it was ascertained that the presence of tripropylamine in the mixture of a sealed circuit laser, caused, after a certain operation time, the forming of a solid composition layer on the discharge electrodes. This induced the present inventors to find out whether the lifetime extension of the laser mixture could be bound to the presence of such a composition at the inside of the laser chamber.

To such purpose the same inventors have tried to reproduce outside of the laser chamber the conditions believed by them to be suitable for the formation of said solid composition layer.

A laser electrode located in a vessel containing a laser mixture of the type 1:1:3 ($CO_2$:$N_2$:He) with the addition of TPA traces has been subjected to radiation by energy electrons or by an ultraviolet radiation until the formation was visually perceived of a layer or coating similar to the layer that forms during a laser operation in which the gaseous mixture has been doped by PTA.

The electrode so "treated", when used in a laser which operates in a sealed regime and in the mixture of which no trace of PTA had been added, gave the same results as those obtained with the same mixture but doped by PTA both with respect to the constance of the $CO_2$ content in the mixture and with respect to the stabilization of the electric discharge and the consequent improvement of the laser efficiency.

The nature of the compound as obtained by through irradiation of TPA by energy electrons or by ultraviolet radiation was not yet defined.

Certainly it is a polymer compound.

From the tests conducted on a $CO_2$ laser operating in sealed circuit, it has been found that the effect of the above compound is independent of the location of its support in the circuit of the gas mixture along the apparatus inside.

Said support can comprise one or both the discharge electrodes, one or more preionisation electrodes, a portion of the inner surface of the discharge chamber or of the gas recycling circuit.

As stated above, the present invention can be applied, much interestedly, in laser sealed systems, particularly in those systems which operate at high repetition rate which can reach up to 1000 pulses per second.

As known, in such kinds of lasers the presence is required within the laser apparatus of powerful heat exchangers for cooling the gaseous mixture which is continuously recycled.

In such apparatus it is impossible to add tripropylamine to the gaseous mixture because tripropylamine having a boiling point of 156° C. is liquid at room pressure and temperature with a vapour tension relatively high and consequently would totally condensate on the heat exchanger elements.

Although the present invention is particularly and surprisingly applicable to sealed lasers, the advantages obtainable with continuous flow lasers are not to be disregarded.

In fact whenever a support at least partly coated by a layer of the compound obtained by irradiating TPA with UV radiation and/or energy electrons is included in the discharge chamber of a laser, the same result can be obtained which is obtainable by a TPA doped laser mixture that is a greater stability and homogeneity of the electric discharge and consequently an efficiency improvement with high specific energy, which allows a reduction of the active laser volume at equal output power.

Obviously in the case of a continuous flow laser, the means which can be used as a support, for the above mentioned compound layer, are limited with respect to a closed circuit laser to the distance and preionisation electrodes, to the discharge chamber walls which are flown over by the discharge gaseous mixture and lastly to specific supports on which the same compound may be deposited either in the site or outside of the apparatus and subsequently introduced into the discharge chamber.

The advantage consequent to the use of the above mentioned compound when compared to a TPA doped mixture, substantially consists of a simplification of the laser gaseous mixture preparation.

The present invention will be now described with reference to the attached drawings by which a preferred embodiment of the invention is illustrated together with the related variants.

Figure 1:
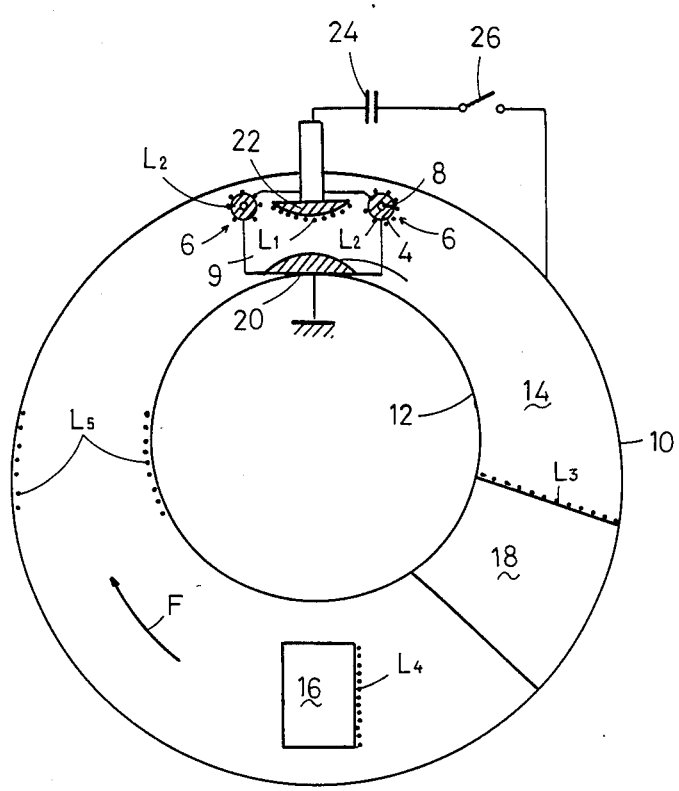
FIG. 1 shows a scheme of a laser apparatus which operates in a sealed regime. Some of the possible locations are shown therein by dotted lines whereby the recombination reactions are favoured of the $CO_2$ dissociation that is of CO and $O_2$.
Figure 2:
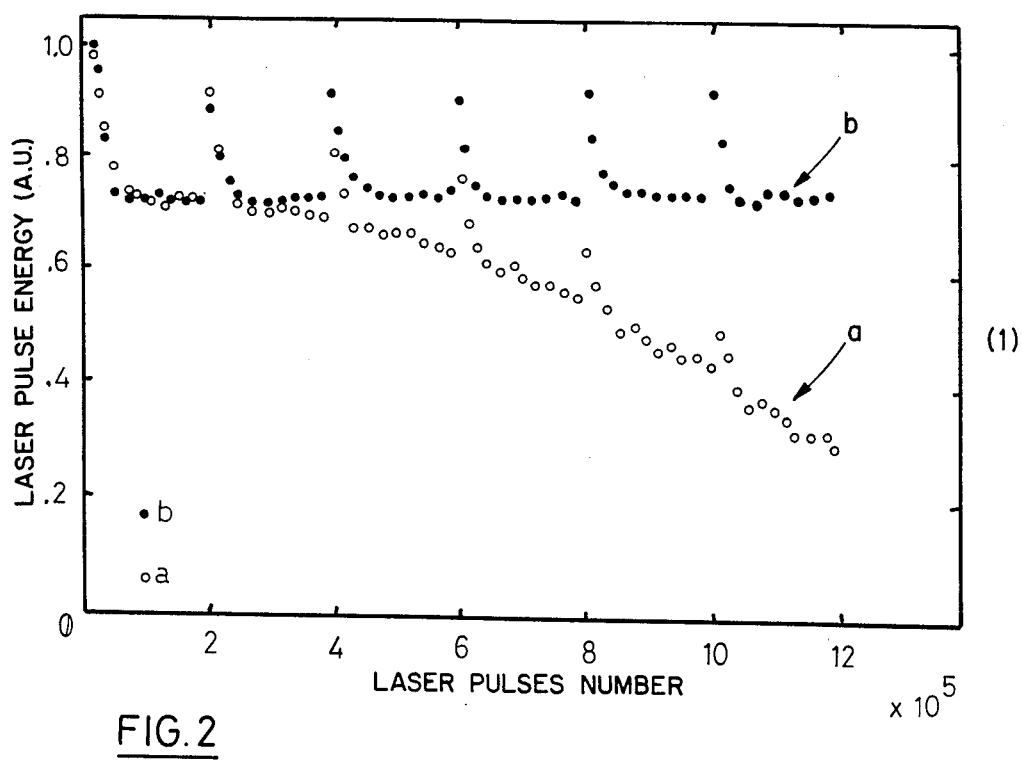
FIG. 2 shows a graph whereby the output energy in a laser not treated according to the method of this invention is compared to the output energy of a laser of which the electrodes have been "treated" according to the invention.
Figure 3:
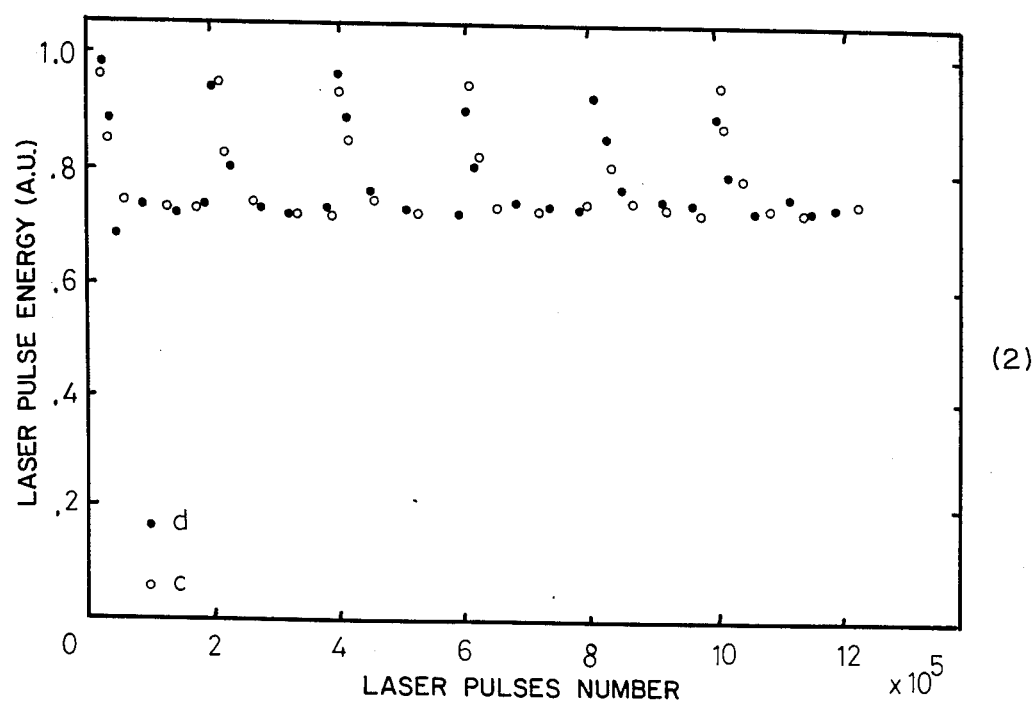
FIG. 3 shows a graph whereby the output energy of a laser of which the electrodes have been "treated" by the method of this invention is compared to the output energy of a laser of which the container but not the electrodes have been "treated" according to the method of this invention.

The laser of FIG. 1, which has been illustrated only as an example, comprises a gastight anular duct 14 along which the $CO_2$ based gaseous mixture circulates in the direction of arrow F. Two discharge electrodes 20 and 22, two corona discharge preionization electrodes 6, are included in chamber 9 while a turbofan 18 and a refrigerator exchanger 16 are included in the rest of the annular duct 14. Discharge electrode 22 (so called hot electrode) is connected with a first plate of a peak capacitor 24 of which the other plate is grounded as are discharge electrode 20 and the framework of annular duct 14.

Dotted lines $L_1$-$L_5$ indicate possible locations of polymer layer with the following meanings:
$L_1$—treatment of the discharge electrodes
$L_2$—treatment of the preionization elements
$L_3$—treatment of the turbofan components
$L_4$—treatment of the refrigerator components
$L_5$—treatment of a portion of the inner surface of the gas recycling duct.

Obviously, said polymer compound in addition to being applicable on any structural and functional part of the apparatus that can be flown onver by the laser gaseous flow, it can also be deposited on a support outside of the laser apparatus, which support is subsequently introduced by a simple operation into said apparatus in a location adapted for being flown over by the gases. For instance such a support may comprise a door by which a window through wall 10,12 of duct 14 is closed.

Two graphs are herein shown which have been obtained with sealed lasers : in the first one (graph (1)) by curve a the decrement is shown of the output energy as a function of the totalized the laser pulses (gas lifetime tests) with a non "treated" apparatus.

Curve b (graph (1)) is related to the apparatus behaviour obtained with a laser "treated" according to the invention.

The second graph (graph (2)) signifiesthe behaviour of the output energy of two apparatus: curve c relates to the performance obtained through a pair of "treated" discharge electrodes which have been placed in a non "treated" container, while curve d relates to a laser wherein the laser container has been "treated" but wherein non "treated" electrodes have been fitted. The trends of curves b, c and d are throughly similar but different from curve a. The advantage of the above "treatment" appears therefore proven.

Some variants of the invention embodiment have been thus described. A number of additional modifications and variants of these embodiments may be envisaged by those skilled in the art. However such modifications and variants are intended as included within the scope of the following claims whenever they are inspired by the informing concept of this invention.

We claim:

1. A method for maintaining at a constant level the $CO_2$ percentage in the laser medium during a laser operation comprising introducing into a laser chamber prior to the laser operation a polymer compound produced through irradiation of tripropylamine by means of ultraviolet photons and/or of energy electrons in the form of a layer on a solid support within said chamber.

2. The method as claimed in claim 1 comprising providing a gastight transparent vessel, putting into said gastight vessel a removable solid support and a laser gaseous mixtured doped with tripropylamine, sealing said vessel, and irradiating said vessel by means of ultraviolet photons and/or energy electrons while keeping it sealed until a layer of solid polymer is formed on said support.

3. A method for maintaining at a constant level the $CO_2$ percentage in a gaseous mixture medium of a laser during a laser operation comprising introducing within a gastight closed circuit along which said gaseous medium is recycled prior to the laser operation a polymer compound produced through irradiation of tripropylamine by means of ultraviolet photons and/or energy electrons in the form of a layer on a solid support within said circuit.

4. The method as claimed in claim 3 comprising providing a gastight transparent vessel, putting into said gastight vessel a removable solid support and a laser gaseous mixture doped with tripropylamine, sealing said vessel, and irradiating said vessel by means of ultraviolet photons and/or energy electrons while keeping it sealed until a layer of solid polymer is formed on said support.

* * * * *